United States Patent
Lee et al.

(10) Patent No.: US 9,349,327 B2
(45) Date of Patent: May 24, 2016

(54) ELECTROPHORETIC DISPLAY APPARATUS, METHOD FOR DRIVING SAME, AND METHOD FOR MEASURING IMAGE STABILITY THEREOF

(75) Inventors: Seunghoon Lee, Jung-ri (KR); Youngjo Ko, Busan (KR)

(73) Assignee: LG Display Co., Ltd., Seoul (KR)

( * ) Notice: Subject to any disclaimer, the term of this patent is extended or adjusted under 35 U.S.C. 154(b) by 213 days.

(21) Appl. No.: 13/243,264

(22) Filed: Sep. 23, 2011

(65) Prior Publication Data

US 2012/0139963 A1    Jun. 7, 2012

(30) Foreign Application Priority Data

Dec. 6, 2010   (KR) .................. 10-2010-0123741
Dec. 7, 2010   (KR) .................. 10-2010-0124179

(51) Int. Cl.
   *G09G 3/34*   (2006.01)
   *G02F 1/167*   (2006.01)

(52) U.S. Cl.
   CPC ............... *G09G 3/344* (2013.01); *G02F 1/167* (2013.01); *G02F 2203/30* (2013.01); *G09G 2300/08* (2013.01); *G09G 2310/04* (2013.01); *G09G 2320/0209* (2013.01); *G09G 2320/0233* (2013.01); *G09G 2320/0247* (2013.01); *G09G 2320/0257* (2013.01); *G09G 2330/021* (2013.01); *G09G 2340/16* (2013.01)

(58) Field of Classification Search
   CPC .............. G09G 3/344; G09G 2310/08; G09G 2310/04; G09G 2310/0262
   See application file for complete search history.

(56) References Cited

U.S. PATENT DOCUMENTS

| | | | | |
|---|---|---|---|---|
| 8,035,611 | B2 * | 10/2011 | Sakamoto | ................ 345/107 |
| 2006/0072158 | A1 * | 4/2006 | Christie | ................ 358/3.01 |
| 2006/0232547 | A1 | 10/2006 | Johnson et al. | |
| 2007/0057907 | A1 * | 3/2007 | Ishii et al. | ................ 345/107 |
| 2007/0212022 | A1 | 9/2007 | Zhou et al. | |

(Continued)

FOREIGN PATENT DOCUMENTS

| | | |
|---|---|---|
| CN | 1823361 A | 8/2006 |
| CN | 1938747 A | 3/2007 |

(Continued)

OTHER PUBLICATIONS

Office Action issued in corresponding Chinese Patent Application No. 201110408117.X, mailed Dec. 4, 2013, 24 pages.

*Primary Examiner* — William Boddie
*Assistant Examiner* — Bryan Earles
(74) *Attorney, Agent, or Firm* — Brinks Gilson & Lione

(57) ABSTRACT

Disclosed are an electrophoretic display apparatus and a method for driving the same, which facilitate minimization of the flickering of the screen as well as minimization of the unintended gray scale transition caused by the neighboring cells. Disclosed also is a method for measuring the image stability of an electrophoretic display apparatus which allows a user to visually recognize any unintended gray scale transition that may occur after a predetermined time passes without a data voltage supplied and to identify whether the degree of the unintended gray scale transition exceeds an allowable range. When an image switching is performed, no data voltage is supplied to a first cell to be maintained with a first gray scale without gray scale transition, and a data voltage of a predetermined waveform is supplied to a second cell to be maintained with a second gray scale without gray scale transition.

16 Claims, 10 Drawing Sheets

(56) References Cited

U.S. PATENT DOCUMENTS

| | | |
|---|---|---|
| 2008/0143668 A1 | 6/2008 | Shin et al. |
| 2009/0154831 A1* | 6/2009 | Lee et al. ............... 382/269 |
| 2009/0237392 A1* | 9/2009 | Kajino ..................... 345/214 |
| 2010/0118046 A1* | 5/2010 | Miyasaka ........ G09G 3/344 345/589 |
| 2010/0271360 A1* | 10/2010 | Lai et al. ................. 345/211 |
| 2010/0283804 A1* | 11/2010 | Sprague et al. ......... 345/690 |

FOREIGN PATENT DOCUMENTS

| | | |
|---|---|---|
| CN | 101201524 A | 6/2008 |
| CN | 101556767 A | 10/2009 |
| CN | 101727836 A | 6/2010 |
| JP | 2007-206471 | 8/2007 |

* cited by examiner

| Current state \ Next State | B(00) | DG(01) | LG(10) | W(11) |
|---|---|---|---|---|
| B(00) | +15V ⎤⎣ 35 25 25 −15V | 35 25 25 | 35 25 25 9 | 35 25 25 35 |
| DG(01) | 5 30 25 25 | 5 30 25 25 | 5 30 25 25 9 | 5 30 25 25 35 |
| LG(10) | 9 26 25 25 | 9 26 25 25 | 9 26 25 25 9 | 9 26 25 25 35 |
| W(11) | 35 25 25 | 35 25 25 | 35 25 25 9 | 35 25 25 35 |

| Current state \ Next State | B(00) | DG(01) | LG(10) | W(11) |
|---|---|---|---|---|
| B(00) | ········· | 35 25 25 5 | 35 25 25 9 | 35 25 25 35 |
| DG(01) | 5 30 25 25 | ········· | 5 30 25 25 9 | 5 30 25 25 35 |
| LG(10) | 9 26 25 25 | 9 26 25 25 5 | ········· | 9 26 25 25 35 |
| W(11) | 35 25 25 | 35 25 25 5 | 35 25 25 9 | ········· |

■ : Z

| Current state \ Next State | B(00) | DG(01) | LG(10) | W(11) |
|---|---|---|---|---|
| B(00) | +15V, 35 25 25, −15V | 35 25 25 5 | 35 25 25 9 | 35 25 25 35 |
| DG(01) | 5 30 25 25 | 5 30 25 25 5 | 5 30 25 25 9 | 5 30 25 25 35 |
| LG(10) | 9 26 25 25 | 9 26 25 25 5 | 9 26 25 25 9 | 9 26 25 25 35 |
| W(11) | 35 25 25 | 35 25 25 5 | 35 25 25 9 | ............ |

(a)

(○)

(b)

(✕)

ELECTROPHORETIC DISPLAY APPARATUS, METHOD FOR DRIVING SAME, AND METHOD FOR MEASURING IMAGE STABILITY THEREOF

CROSS REFERENCE TO RELATED APPLICATIONS

This application claims the benefits of the Korean Patent Applications Nos. 10-2010-0123741 filed on Dec. 6, 2010 and 10-2010-0124179 filed on Dec. 7, 2010, which are hereby incorporated by reference for all purposes as if fully set forth herein.

BACKGROUND OF THE DISCLOSURE

1. Field of the Disclosure

The present disclosure relates to an electrophoretic display apparatus, a method for driving the same, and a method for measuring image stability thereof.

2. Discussion of the Related Art

An electrophoretic display apparatus is one of the flat panel display devices mainly used for manufacturing an e-book.

The electrophoretic display apparatus includes two electrodes facing each other, and an electrophoretic dispersion disposed therebetween. In a microcapsule type, a plurality of microcapsules containing an electrophoretic dispersion therein form a layer between the two electrodes. In a microcup type, an electrophoretic dispersion is divided by partition walls which define a plurality of pixels. Colored charged particles included in the electrophoretic dispersion move to an electrode of an opposite polarity through electrophoresis if an electric field is applied between the two electrodes, whereby an image can be displayed.

Since the electrophoretic display apparatus has bistability, the original image can be maintained for a long time even after the electric field applied between the electrodes is removed. In other words, the electrophoretic display apparatus can maintain a certain image for a long time although a voltage is not continuously provided thereto. Accordingly, the electrophoretic display apparatus is suitable for the applications that do not require a quick image switching.

On the other hand, due to such bistability, impulse required to change a gray scale of a certain cell for an image switching depends on the current gray scale, the next gray scale, and the time for which the current gray scale has been maintained as well. This dependency requires each cell to be refreshed before it is updated for the image switching. Refreshing of the cells causes flickering of the screen during the image switching and thus causes additional power consumption.

Meanwhile, in spite of the bistability, as a certain length of time passes, the charged particles in the electrophoretic dispersion might slightly move due to their electrical interaction and the gravity whereby causing a certain degree of gray scale transition which has never been wanted. Among the important factors that determine the performance of the electrophoretic display apparatus is how long an image can be stably maintained after the electrical field between the electrodes is removed. Nonetheless, a proper method for measuring the image stability of an electrophoretic display apparatus has not been suggested yet.

SUMMARY

An electrophoretic display apparatus comprises an electrophoretic display panel including gate lines and data lines, which cross each other; a gate driver sequentially supplying a scan pulse to the gate lines; and a data driver supplying a data voltage to the data lines, wherein, when an image switching is performed under a first driving mode, the data driver does not supply a data voltage to a first cell to be maintained with a first gray scale without gray scale transition during the image switching while supplying a second cell to be maintained with a second gray scale without gray scale transition during the image switching with a data voltage of a predetermined waveform necessary to maintain the second gray scale.

In another aspect of the present invention, there is provided a method for driving an electrophoretic display apparatus, the method comprising displaying a first image; and performing an image switching from the first image to a second image, wherein the image switching includes refreshing a second cell to be maintained with a second gray scale without gray scale transition during the image switching while not refreshing a first cell to be maintained with a first gray scale without gray scale transition during the image switching.

In still another aspect of the present invention, there is provided a method for measuring image stability of an electrophoretic display apparatus including an electrophoretic display panel with first and second regions adjacent to each other, the method comprising displaying a first image; and performing an image switching from the first image to a second image, wherein, when the image switching is performed, no data voltage is supplied to first cells corresponding to the first region and a data voltage for gray scale transition is supplied to second cells corresponding to the second region.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE EXEMPLARY EMBODIMENTS

Figure 1:
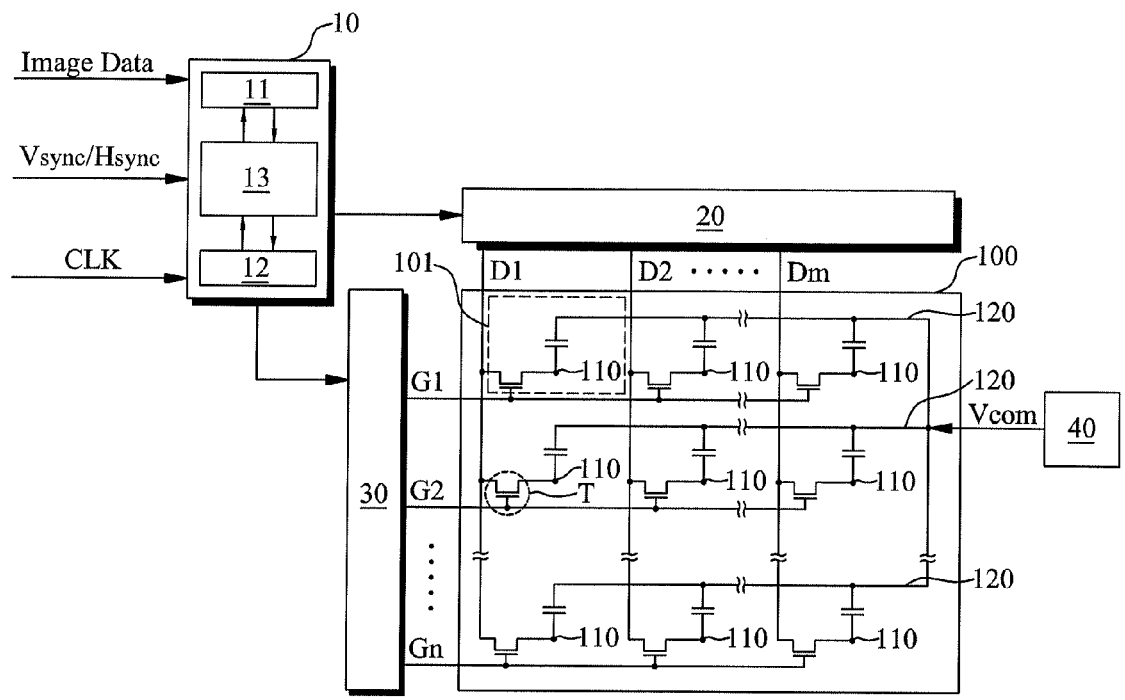
FIG. 1 and FIG. 2 are diagrams illustrating an electrophoretic display apparatus and a unit cell according to one embodiment of the present invention.

Reference will now be made in detail to the exemplary embodiments of the present invention, examples of which are illustrated in the accompanying drawings. Wherever possible, the same reference numbers will be used throughout the drawings to refer to the same or like parts.

Hereinafter, embodiments of an electrophoretic display apparatus, a method for driving the same, and a method for measuring image stability thereof according to the present invention will be described in detail with reference to the accompanying drawings.

Although the technical idea of the present invention can be applied to all electrophoretic display apparatuses regardless of their ability to display colors, for convenience of description, a mono type electrophoretic display apparatus that displays black and white only will be described. In other words, technical idea of the present invention, which are disclosed hereinafter, can be applied to an electrophoretic display apparatus in which charged particles within an electrophoretic dispersion are colored with red, blue, green or white, as well as an electrophoretic display apparatus that additionally includes a color filter.

While the technical ideas of the present invention can be applied to a microcapsule type electrophoretic display apparatus including an electrophoretic dispersion disposed within capsules as well as a microcup type electrophoretic display apparatus including an electrophoretic dispersion disposed within cavities defined by partition walls, for convenience of description, the microcapsule type electrophoretic display apparatus will be described for the explanation of the present invention.

In the present invention, the terminology "gray scale" means two extreme optical states and different displayable optical states between the two extreme optical states. The two extreme optical states do not mean white and block only. For example, the two extreme optical states may be white and blue. In this case, middle gray scales between the two extreme optical states may be colors of sky blue type.

In this specification, the terminology "image switching" means that a screen of an electrophoretic display panel is switched from a specific image to another next image.

In this specification, the terminology "gray scale transition between images" means gray scale transition of a specific cell when a screen is switched from a current image to a next image.

In this specification, the terminology "frame" means a unit period during which scan pulses are sequentially applied to the first gate line to the last gate line.

In this specification, the terminology "super frame" means a set of frames required for switching of an image displayed in the screen. For example, one super frame includes 128 frames, and it means that a total of 128 frames are required for an image switching.

In this specification, the terminology "super frame digital image data" means a set of digital image data for generating data voltages to be supplied to data lines for a super frame.

Figure 2:
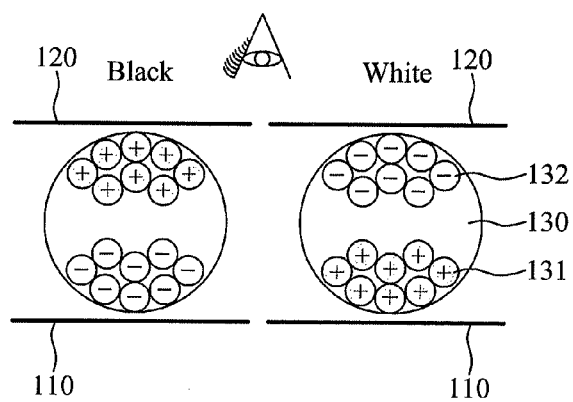

FIG. 1 and FIG. 2 are diagrams illustrating an electrophoretic display apparatus and a unit cell according to one embodiment of the present invention.

As shown in FIG. 1, the electrophoretic display apparatus according to the embodiment of the present invention includes an electrophoretic display panel 100 where m×n cells 101 formed with data lines D1 to Dm and gate lines G1 to Gn crossing one other are arranged in a matrix arrangement, a data driver 20 supplying a data voltage to the data lines D1 to Dm, a gate driver 30 supplying a scan pulse to the gate lines G1 to Gn, a common voltage generator 40, and a control unit 10 controlling the data and gate drivers 20 and 30 and the common voltage generator 40.

In case of a mono type electrophoretic display apparatus that displays black and white only, each of the cells 101 forms one pixel. However, in case of a color electrophoretic display apparatus, cells 101 for red, green and blue (including white as the case may be) serve as sub pixels respectively and form one pixel together.

The cells 101 have thin film transistors T at the regions where the data lines D1 to Dm cross the gate lines G1 to Gn. The gate electrodes of the thin film transistors T are connected to the gate lines G1 to Gn, their source electrodes are connected to the data lines D1 to Dm, and their drain electrodes are connected to their corresponding pixel electrodes 110. The thin film transistors T are turned on in response to the scan pulses from the gate lines G1 to Gn connected thereto, and forward to the pixel electrodes 110 the data voltages from the data lines D1 to Dm connected thereto.

The electrophoretic display panel 100, as shown in FIG. 2, has a transparent common electrode 120 over the pixel electrode 110. The common electrode 120 simultaneously supplies a common voltage Vcom to all the cells 101. Also, the electrophoretic display panel 100 includes a plurality of microcapsules 130 interposed between the pixel electrodes 110 and the common electrode 120. Each of the microcapsules 130 contains an electrophoretic dispersion therein. The electrophoretic dispersion includes a dielectric solvent and charged particles 131 and 132 respectively charged with positive and negative and dispersed in the dielectric solvent.

Although FIG. 2 illustrates an electrophoretic dispersion in which black particles 131 charged with positive and white particles 132 charged with negative are dispersed in a colorless dielectric solvent, the electrophoretic dispersion of the present invention is not limited to the example of FIG. 2. An electrophoretic dispersion in which white particles charged with positive and black particles charged with negative are dispersed in a colorless dielectric solvent, an electrophoretic dispersion in which charged white particles are dispersed in a dielectric solvent containing a black dye, and an electrophoretic dispersion in which charged black particles are dispersed in a dielectric solvent containing a white dye also may be used as the electrophoretic dispersion of the present invention. It is to be understood by those skilled person in the art that a phase and a sustain time of a driving voltage waveform, which will be described later in more detail, may be varied depending on the electrophoretic dispersion in each case.

If the data voltage and the common voltage are respectively applied to the pixel electrode 110 and the common electrode 120, the colored charged particles 131 and 132 in the electrophoretic dispersion respectively move to the electrodes of their opposite polarities by electrophoresis so that black or white can be displayed in the corresponding cell 101.

The data driver 20 of the present invention includes a plurality of data driving ICs each of which includes a shift register, a latch, a multiplexer (MUX), an output buffer, and so on. The data driver 20 latches digital image data under the control of the control unit 10 and generates the data voltage to be supplied to the data lines D1 to Dm by using the digital image data.

The gate driver 30 of the present invention includes a plurality of gate driving ICs, each of which includes a shift register, a level shifter for shifting a swing width of an output signal of the shift register to a swing width suitable for driving the thin film transistor T, and an output buffer between the level shift and the gate lines G1 to Gn. The gate driver 30 sequentially outputs scan pulses synchronized with the data voltages supplied to the data lines D1 to Dm.

The common voltage generator 40 of the present invention generates a common voltage Vcom and supplies it to the common electrode 120.

The control unit 10 of the present invention includes an image memory 11, a look-up table memory 12, and a controller 13.

Current image data CD and next image data ND are respectively stored in the image memory 11 in accordance with the image data provided from an external device.

A look-up table that includes the information about the driving voltage waveforms to be supplied to a cell 101 for every each case of the gray scale transitions (for example, B→B, B→W, W→B, W→W if two gray scales are only displayed) is stored in the look-up table memory 12. In case of an electrophoretic display apparatus that can display n gray scales, the driving voltage waveform data for n×n cases are stored in the look-up table.

According to the present invention, the electrophoretic display apparatus can be driven under a plurality of driving modes. In this case, a plurality of look-up tables corresponding to the respective driving modes are stored in the look-up table memory 12.

The controller 13 of the present invention is supplied with vertical/horizontal synchronizing signals V and H and a clock signal CLK to generate control signals for controlling the driving timing of the data driver 20 and the gate driver 30. In more detail, the controller 13 generates a data driving control signal DDC and a gate driving control signal GDC by using the vertical/horizontal synchronizing signals V and H and the clock signal CLK and respectively supplies the generated control signals to the data driver 20 and the gate driver 30. In this case, the data driving control signal DDC includes a source shift clock (SSC), a source start pulse (SSP), and a source output enable signal (SOE). The gate driving control signal GDC includes a gate start pulse (GSP), a gate shift clock (GSC), and a gate output enable signal (GOE).

The controller 13 of the present invention determines a waveform of the driving voltage for gray scale transition between images based on the current image data CD and the next image data ND stored in the image memory 11, and generates super frame digital image data Dsf, which are to be supplied to the data driver 20, based on the driving voltage waveforms as determined for every each cell 101. This will be described in more detail with reference to FIG. 3 to FIG. 5.

Figures 3, 4:
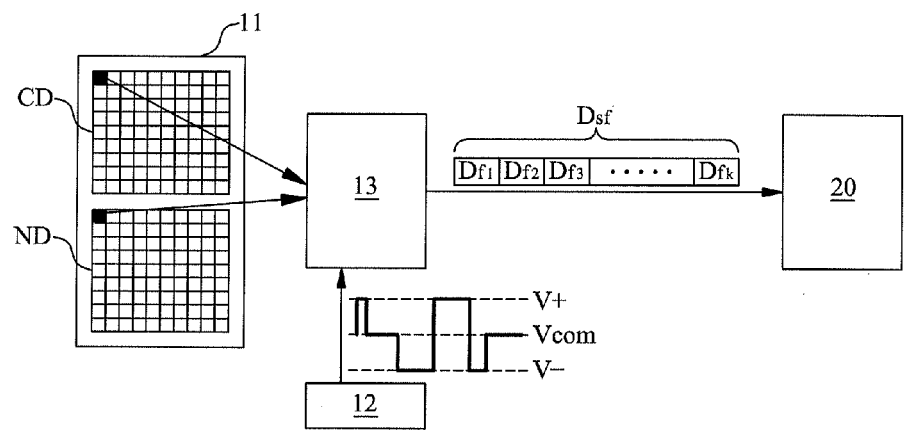
FIG. 3 is a diagram illustrating a process of determining a waveform of a driving voltage to be supplied to a cell in accordance with the gray scale transitions between images and a process of generating super frame digital image data based on the determined waveforms.
FIG. 4 illustrates a look-up table based on a grayscale clear (GC) driving mode.

FIG. 3 is a diagram illustrating a process of determining a waveform of a driving voltage to be supplied to a cell 100 in accordance with the gray scale transition between images and a process of generating super frame digital image data based on the determined waveforms.

As shown in FIG. 3, the controller 13 identifies the gray scale transition between images for each cell 101 by using the current image data CD and the next image data ND stored in the image memory 11, and selects a driving voltage waveform corresponding to the identified gray scale transition from the look-up table. Generally, to switch the current image into the next image, one super frame (SF) is required, wherein one super frame (SF) includes k frames (F). Accordingly, the driving voltage waveform information for gray scale transition between images stored in the look-up table is the waveform information to be supplied to the corresponding cell 101 for the super frame (SF).

After obtaining driving voltage waveform information corresponding to each of all the cells 101 of the electrophoretic display panel 100, the controller 13 generates super frame digital image data Dsf to be supplied to the data driver 20 for the super frame (SF) by using the driving voltage waveform information and the output from a frame counter (not shown), and transmits the generated super frame digital image data Dsf to the data driver 20 together with the timing control signals. The super frame digital image data Dsf are a set of digital image data $D_{f1}$ to $D_{fk}$ for each of k frames (F) constituting a super frame (SF).

The data driver 20 latches the super frame digital image data Dsf under the control of the control unit 10 and generates the data voltages to be supplied to each of the data lines D1 to Dm for the super frame (SF).

FIG. 4 illustrates a look-up table based on a grayscale clear (GC) driving mode.

The driving voltage waveforms stored in the look-up table depend on a type of a dispersion solvent of the electrophoretic dispersion, a type of charged particles 131 and 132, and cohesion between the charged particles 131 and 132. Although FIG. 4 illustrates, for convenience of description, an electrophoretic display apparatus being able to display only four gray scales, driving voltage waveform information for n×n cases will be stored in the look-up table in case of an electrophoretic display apparatus that can display n gray scales. In FIG. 4, 'W(11)' represents white, 'LG(10)' represents light gray, 'DG(01)' represents dark gray, and 'B(00)' represents black. The number listed below the driving voltage waveform represents the number of frames (F).

Figure 5:
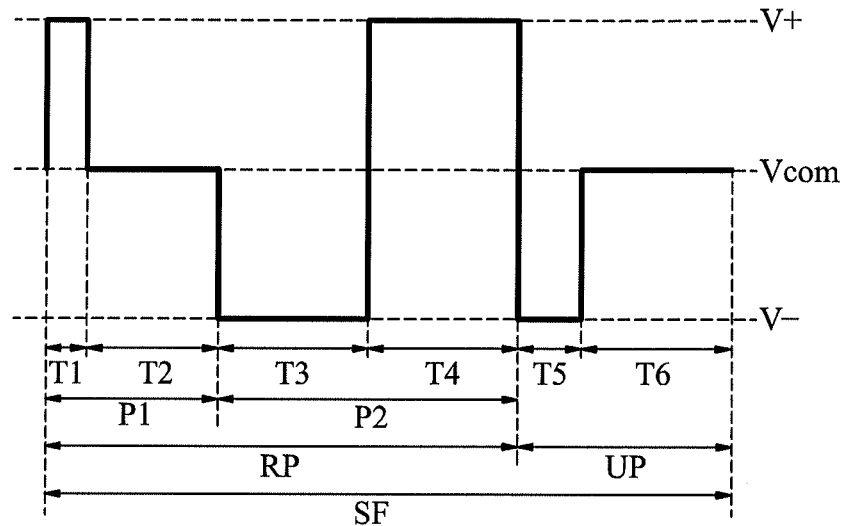
FIG. 5 illustrates a driving voltage waveform corresponding to the gray scale transition from dark gray (DG) to white gray (WG) in the look-up table of FIG. 4.

FIG. 5 is a driving voltage waveform corresponding to gray scale transition between images from dark gray (DG) to white gray (WG) in the look-up table of FIG. 4.

According to the GC driving mode, the super frame (SF) is divided into a refresh period (RP) and an update period (UP) for gray scale transition between images, whereby an electrophoretic medium is driven by a time division method. Accordingly, the driving voltage waveform of the GC driving mode includes a first sub-waveform for refresh and a second sub-waveform for update.

Optionally, as shown in FIG. 5, the refresh period (RP) can include a primary refresh period P1 and a secondary refresh period P2.

The primary refresh period P1 can include a first period T1 where a positive voltage V+ is applied to the corresponding cell 101 and a second period T2 where a voltage (for example, 0V) not substantially different from the common voltage Vcom is applied to the corresponding cell 101. The positive voltage means a voltage relatively greater than the common voltage Vcom, and is +15V, for example. The number of frames (F) corresponding to the first period T1 of the primary refresh period P1 is 0 if the current state of the corresponding cell 101 is black (B), and increases as the current state is close to white (W).

The secondary refresh period P2 is the period for making the electrophoretic medium corresponding to the corresponding cell 101 a bistability state by separating all the charged particles 131 and 132 in the electrophoretic medium from one another. The secondary refresh period P2 can include a first period T3 for applying a negative voltage V− to the corresponding cell 101, and a second period T4 for applying a positive voltage V+ to the corresponding cell 101. The number of frames (F) corresponding to each of the first and second periods T3 and T4 of the secondary refresh period P2 can be fixed constantly. At the end of the secondary refresh period P2, all the black particles 131 charged with positive exist at the common electrode 120 while all the white particles 132 charged with negative exist at the pixel electrode 110. Namely, the black particles 131 and the white particles 132 in the electrophoretic medium are perfectly separated from each other.

As described above, since the driving voltage waveforms stored in the look-up table depend on a type of a dispersion solvent of the electrophoretic dispersion, a type of charged particles 131 and 132, and cohesion between the charged particles 131 and 132, as the case may be, the primary refresh period P1 may be omitted and the refresh period (RP) may include the secondary refresh period P2 only.

The update period (UP) can include a first period T5 where a negative voltage V− is applied to the corresponding cell 101 and a second period T6 where a voltage (for example, 0V) not substantially different from the common voltage Vcom is applied to the corresponding cell 101. The number of frames (F) corresponding to the first period T5 of the update period (UP) is 0 if the next state of the corresponding cell 101 is black (B), and increases as the next state is close to white (W).

Optionally, the voltage of the opposite phase may be applied to the corresponding cell 101 during the first period T1 of the primary refresh period P1, the first and second periods T3 and T4 of the secondary refresh period P2, and the first period T5 of the update period (UP). In this case, the number of frames (F) corresponding to the first period T1 of the primary refresh period P1 is 0 if the current state of the corresponding cell 101 is white (W), and will increase as the current state is close to black (B). Also, at the end of the secondary refresh period P2, all the white particles 132 charged with negative will exist at the common electrode 120 while all the black particles 131 charged with positive will exist at the pixel electrode 110. Also, the number of frames (F) corresponding to the first period T5 of the update period (UP) is 0 if the next state of the corresponding cell 101 is white (W), and will increase as the next state is close to black (B).

According to the look-up table based on the GC driving mode as illustrated in FIG. 4, a first sub-waveform for refresh of a cell 101 exists for all gray scale transitions between images. Namely, when an image switching is performed under the GC driving mode based on the look-up table as illustrated in FIG. 4, predetermined data voltages for refresh and update are applied to even the cell which will not undergo any gray scale transition as well as the cell which will undergo gray scale transition. Accordingly, all the cells 101 of the electrophoretic display panel 100 are refreshed at the same time whenever an image switching is performed, which causes the flickering of the screen.

Figure 6:
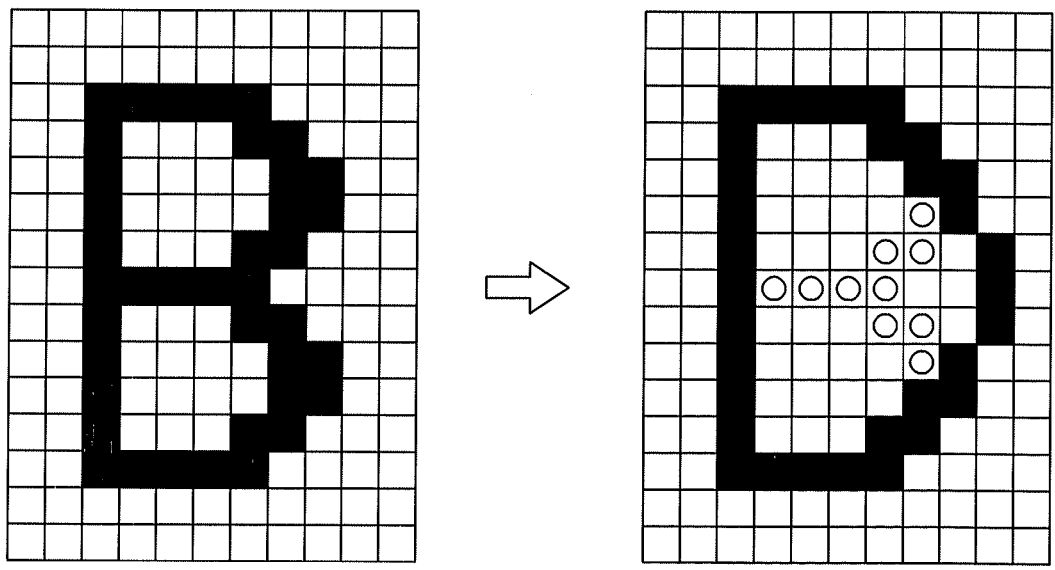
FIG. 6 is a diagram illustrating the gray scale transition of each cell during an image switching.

In case of the e-book, a black text is displayed on a white basis. When the user turns over a page, i.e., when an image switching is performed, a margin portion of the corresponding page is maintained with a white color without any color change. Also, even in case of a black colored cell for the text of the current image, the cell may be maintained with a black color if it is to be used for displaying the text of the next page. As a result, during an image switching of the e-book, the number of cells which will not undergo gray scale transition may be greater than the number of cells which will undergo gray scale transition. For example, as shown in FIG. 6, when the text switching from "B" to "D" is performed, 152 cells (X) of a total of 165 cells are not subject to gray scale transition, and only 13 cells (Y) are subject to gray scale transition.

In case of the e-book where a number of cells are not subject to gray scale transition during an image switching, if the electrophoretic display apparatus is driven by the GC driving mode based on the look-up table as illustrated in FIG. 4, all the cells are refreshed whenever an image switching is performed, which causes both inefficiency and waste of power. Particularly, screen flickering due to the refresh of all the cells increases the eye fatigue in case of an application having a relatively short image switching period such as e-book.

Figures 7, 8:
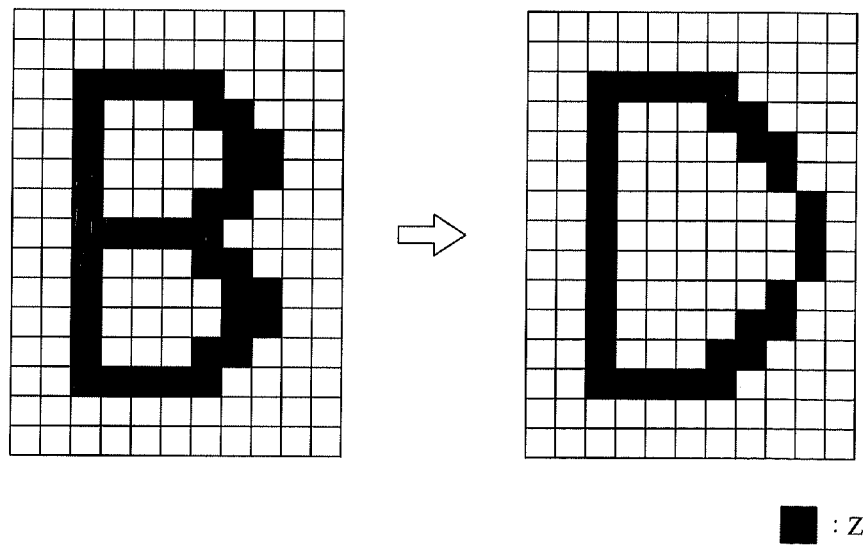
FIG. 7 illustrates a look-up table based on a grayscale update (GU) driving mode.
FIG. 8 and FIG. 9 are diagrams for explaining an effect of gray scale transition of a specific cell to a neighboring cell when an image switching is performed under the GU driving mode.

In order to solve the above problem, it might be considered that the electrophoretic display apparatus be driven by a grayscale update (GU) driving mode based on a look-up table illustrated in FIG. 7.

According to the GU driving mode, data voltages for refresh and update are not applied to the cells which will not undergo gray scale transition when an image switching is performed. The data voltages for refresh and update are applied to only the cells that are subject to gray scale transition when an image switching is performed. The GU driving mode is advantageous in that it minimizes flickering during an image switching and reduces power consumption as such.

However, in case of the GU driving mode, a problem may occur in that a cell subject to no gray scale transition may be affected by gray scale transition of the neighboring cells and thus may lose its optical state. For example, as shown in FIG. 8, when a text switching from "B" to "D" is performed, cells to be finally displayed with a black color may be affected by the gray scale transition of the neighboring cells, whereby cells (Z) failing to display a perfect black color may exist at a boundary portion with the neighboring cell.

Hereinafter, the reason why the cells (Z) failing to display a perfect black color exist will be described in more detail with reference to FIG. 9.

If data voltages for refresh/update are applied to the corresponding pixel electrode 110 at a specific cell, charged particles 131 and 132 of a cell adjacent to the specific cell may partially be interfered by the data voltage and may move although they are supposed not to move. Particularly, the charged particles 131 and 132 existing at a region (A) adjacent to the specific cell for which the data voltage is applied to the pixel electrode 110 are vulnerable to such interference.

Accordingly, even in case of a cell for which no data voltage is applied for maintaining a black color during a text switching in accordance with the GU driving mode, if its neighboring cells are repeatedly subject to gray scale transition, the cell to be maintained with a black color will partially undergo an unwanted gray scale transition. As a result, the cell may lose its optical state and the user cannot read text any more.

In other words, if the electrophoretic display apparatus is driven in accordance with the GU driving mode, it is advantageous in that the flickering of the screen can be reduced during an image switching. However, a problem may occur in that the picture quality is gradually deteriorated as the image switching is repeated.

Hereinafter, a grayscale low flash (GL) driving mode of the present invention, which can reduce the eye fatigue by minimizing the flickering of the screen and at the same time minimize the deterioration of picture quality which might be caused by the repetition of an image switching, will be described in more detail with reference to FIG. 10.

Figures 9, 10:
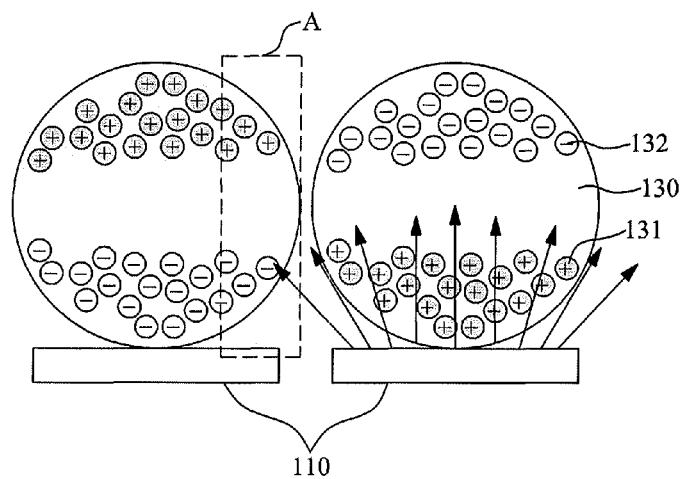
FIG. 10 illustrates a look-up table based on a grayscale low flash (GL) driving mode.

According to the look-up table illustrated in FIG. 10, when an image switching is performed, a cell to be maintained with white (W) is neither refreshed nor updated. Namely, no data voltage is supplied from the data driver 20 to the cell to be maintained with white (W). On the other hand, data voltages of predetermined waveforms necessary to maintain the gray scales other than white, i.e., a data voltage of a first sub-waveform for refresh and a data voltage of a second sub-waveform for update, are sequentially supplied by the data driver 20 to a cell to be maintained with a gray scale other than white (W), such as black (B), dark gray (DG), or light gray (LG). The data voltages of predetermined waveforms for refresh and update are also supplied by the data driver 20 to the cell where gray scale transition is supposed to occur.

If the GL driving mode illustrated in FIG. 10 is applied to e-book, since no data voltage is supplied to cells (cells to be maintained with white color during an image switching) at the margin portion that occupies a considerable portion of the screen, flickering of the screen can be reduced remarkably. At the same time, the data voltages of predetermined waveforms for refresh and update are sequentially applied by the data driver 20 to the cells to be maintained with a gray scale other than white as well as the cells subject to gray scale transition. As a result, the interference due to the gray scale transition of the neighboring cells can be removed or, if any, can be minimized, whereby clear and definite picture can be obtained.

If a gray scale other than white, for example, light gray (LG) is set for a margin portion of a page for application of e-book, a look-up table can be corrected to correspond to such initial setting. Namely, no data voltage will be supplied by the data driver 20 to the cell to be maintained with light gray (LG), and data voltages of predetermined waveforms will be supplied by the data driver 20 to the cells to be maintained with a gray scale other than light gray (LG), such as white (W), black (B), or dark gray (DG) to maintain the corresponding gray scale of the cells.

In short, according to the GL driving mode, when an image switching from a first image to a second image is performed after the first image is displayed, a first cell to be maintained with a first gray scale (in case of e-book, the first gray scale is typically white color although a gray scale other than white may also be used as the first gray scale) without gray scale transition during the image switching is not refreshed while a second cell to be maintained with a second gray scale (a gray scale different from the first gray scale) without gray scale transition during the image switching is refreshed. After the second cell is refreshed, it is updated into the second gray scale. The first cell which is not refreshed is not updated either.

Meanwhile, as described above, if the electrophoretic display apparatus of the present invention uses a plurality of driving modes, for example, GC, GU and GL driving modes, look-up tables corresponding to the respective driving modes are stored in the look-up table memory 12. If a specific driving mode is selected by an user, the controller 13 obtains a driving voltage waveform for gray scale transition between images from the look-up table corresponding to the selected driving mode. Optionally, the controller 13 may select a driving mode in accordance with a previously set reference(s) without receiving an external signal related to the selection of the driving mode. For example, the number of cells 101 where gray scale transition for an image switching will occur can be identified using the current image data (CD) and next image data (ND), and the driving mode can be selected based on the identified number of such cells.

If the GL driving mode based on the look-up table illustrated in FIG. 10 is selected, the data driver 20 does not supply a data voltage to a cell to be maintained with white (W) without gray scale transition during an image switching but sequentially supplies a sub-waveform for refresh and a sub-waveform for update to a cell to be maintained with gray scale other than white (W). On the other hand, if the GC driving mode based on the look-up table illustrated in FIG. 4 is selected, the data driver 20 sequentially supplies a sub-waveform for refresh and a sub-waveform for update to all the cells regardless of whether gray scale transition occurs or not at the cells during an image switching.

Hereinafter, a method for measuring the image stability of an electrophoretic display apparatus will be described in more detail.

Figure 11:
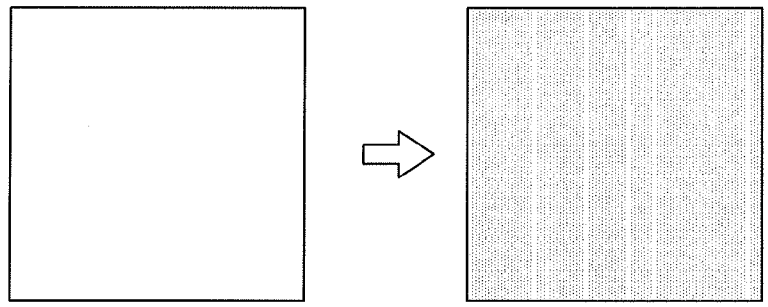
FIG. 11 is a diagram illustrating an example of a method for measuring the image stability using the GC driving mode only.

First of all, a method for measuring the image stability using the GC driving mode illustrated in FIG. 4 will be described with reference to FIG. 11.

After a data voltage for refresh is supplied to all the cells of the electrophoretic display apparatus, a data voltage for updating the cells into a predetermined gray scale, for example, white, is supplied to them. Namely, the screen of the electrophoretic display apparatus is displayed with white in accordance with the GC driving mode. After the screen is displayed with white, optical property, i.e., reflectivity is measured.

Subsequently, the electrophoretic display panel is maintained as it is for a predetermined time, for example, tem minutes, without an image switching, and then the reflectivity thereof is measured.

If any unwanted gray scale transition occurs due to the slight movement of the charged particles within the electrophoretic dispersion for 10 minutes without data voltages supplied, the change of the reflectivity will be detected.

The above method has a limitation in that the image stability of an electrophoretic display apparatus cannot be identified numerically by a reflectivity measurement equipment. Also, in case of a display product that emphasizes visibility, it is important that any unwanted gray scale transition and the degree thereof should be recognized by an user through his/her eyes. Nonetheless, since the unwanted gray scale transition from white to another gray scale occurs through the entire screen, the degree of the gray scale transition cannot be identified by the user through comparison.

According to the present invention to solve the above limitation and problem, after a specific image is displayed under the GC driving mode, an image switching is performed using the GU driving mode illustrated in FIG. 7 or the GL driving mode illustrated in FIG. 10 to measure the image stability of the electrophoretic display apparatus.

According to the look-up table of FIG. 7 that illustrates the GU driving mode, no data voltages for refresh and update are applied to the cells where gray scale transition does not occur when an image switching is performed. The data voltages for refresh and update are only supplied to the cells where gray scale transition occurs.

According to the look-up table of FIG. 10 that illustrates the GL driving mode, the cell to be maintained with white (W) without gray scale transition when an image switching is performed is neither refreshed nor updated. Namely, no data voltage is supplied by the data driver 20 to the cell(s) to be maintained with white (W). On the other hand, a data voltage of a first sub-waveform for refreshing a cell and a data voltage of a second sub-waveform for updating the cell are sequentially supplied by the data driver 20 to the cell which is to be maintained with a gray scale other than white (W), such as black (B), dark gray (DG), or light gray (LG). The data voltages of the predetermined waveforms for refresh and update are also supplied to the cells where gray scale transition occurs.

Optionally, a look-up table for the GL driving mode can be made in such a way that no data voltage is supplied to a cell to be maintained with black (B), an extreme optical state other than white (W), and data voltages of the predetermined waveforms necessary to maintain the gray scales other than black (B) are supplied to the cells to be maintained with white (W), light gray (LG), or dark gray (DG).

In short, according to the GC driving mode, data voltages for refresh and update are supplied to all the cells regardless of whether the gray scale transition occurs or not during an image switching. On the other hand, according to the GU driving mode, the data voltages for refresh and update are not supplied to the cell where gray scale transition does not occur during an image switching, but supplied to the cells where gray scale transition occurs. Meanwhile, according to the GL driving mode, the data voltages for refresh and update are not supplied to the cell to be maintained during an image switching with a certain color (for example, white), one of the extreme optical states, but supplied to the other cells even though they are maintained with their gray scales during the image switching and thus any gray scale transition does not occur as long as their gray scales are not the color (white).

Hereinafter, embodiments of the method for measuring the image stability of an electrophoretic display apparatus according to the present invention using the GC, GU, and GL modes will be described in more detail.

Figure 12:
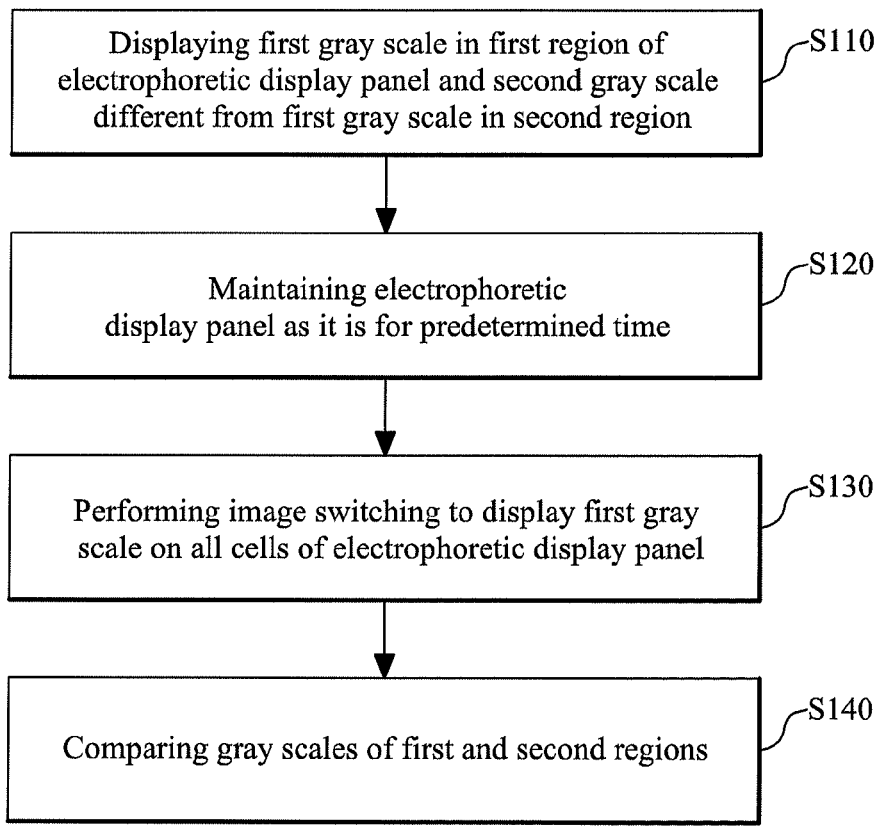
FIG. 12 is a flow chart illustrating a method for measuring the image stability according to the first embodiment of the present invention.

The method for measuring the image stability of an electrophoretic display apparatus according to the first embodiment of the present invention will be described with reference to FIG. 12 and FIG. 13.

First of all, a display step for displaying a first gray scale in a first region X of an electrophoretic display panel and a second gray scale different from the first gray scale in a second region Y is performed (S110).

In order to measure the image stability exactly, it is preferable that all the cells of the electrophoretic display panel are updated after being refreshed. Accordingly, the display step S110 can be performed by the GC driving mode. Also, in order to easily identify the gray scale transition and its degree, the second region Y may adjoin the first region X.

Subsequently, the electrophoretic display panel is maintained as it is for a predetermined time without an image switching, i.e., without a data voltage supplied (S120). In this case, the predetermined time should be long enough to identify the image stability of the electrophoretic display apparatus. For example, the predetermined time can be ten minutes to thirty minutes.

Subsequently, an image switching step to display the first gray scale on all the cells of the electrophoretic display panel is performed (S130). At this time, no data voltage is supplied to the first cells corresponding to the first region X to be maintained with the first gray scale. On the other hand, a data voltage for gray scale transition from the second gray scale to the first gray scale is supplied to the second cells corresponding to the second region Y.

In order to perform the image switching step, either of the aforementioned GU or GL driving mode can be used. If the GU driving mode is used for the image switching, although the first region X is illustrated as white in FIG. 13, the first gray scale is not limited to white but can be any gray scale. However, if the GL driving mode is used for the image switching, the first gray scale should be the one that is set under the GL driving mode such that no data voltage should be supplied to a cell to be maintained with that gray scale during an image switching. For example, if a gray scale set such that no data voltage is supplied to the cell when the gray scale thereof is to be maintained under the GL driving mode is any one of two extreme optical states, the first gray scale should be the one.

After the image switching is completed, the gray scale of the first region X and the gray scale of the second region Y are compared with each other (S140). As shown in FIG. 13, the shapes of the first and second regions X and Y can be identified by an user through his/her eyes due to the difference of the gray scale between the first region X maintained with the first gray scale through the image switching and the second region Y transited from the second gray scale to the first gray scale. While the second region Y displays the first gray scale definitely through refresh and update, the first region X maintained with the first gray scale for a predetermined time without any data voltage supplied cannot display the first gray scale perfectly due to the unintended movement of the charged particles. For this reason, the difference of the gray scale between the first and second regions X and Y occurs. Since the first and second regions X and Y adjoin each other, the difference of the gray scale between the first and second regions X and Y and its degree can be easily recognized by an user through his/her eyes.

Figure 13:
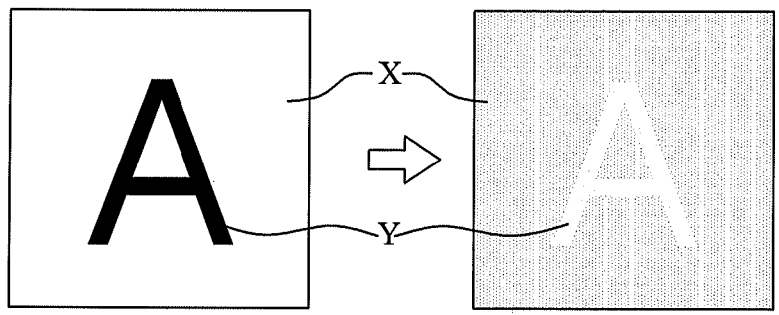
FIG. 13 is a diagram illustrating an image switching performed when the image stability is measured according to the first embodiment of the present invention.

It might be said that a so-called 'ghosting phenomenon' has occurred in that the shapes of the first and second regions X and Y which could be identified prior to the image switching can still be identified as illustrated in FIG. 13 even after the image switching step to display the first gray scale on all the cells of the electrophoretic display panel is performed.

Figure 14:
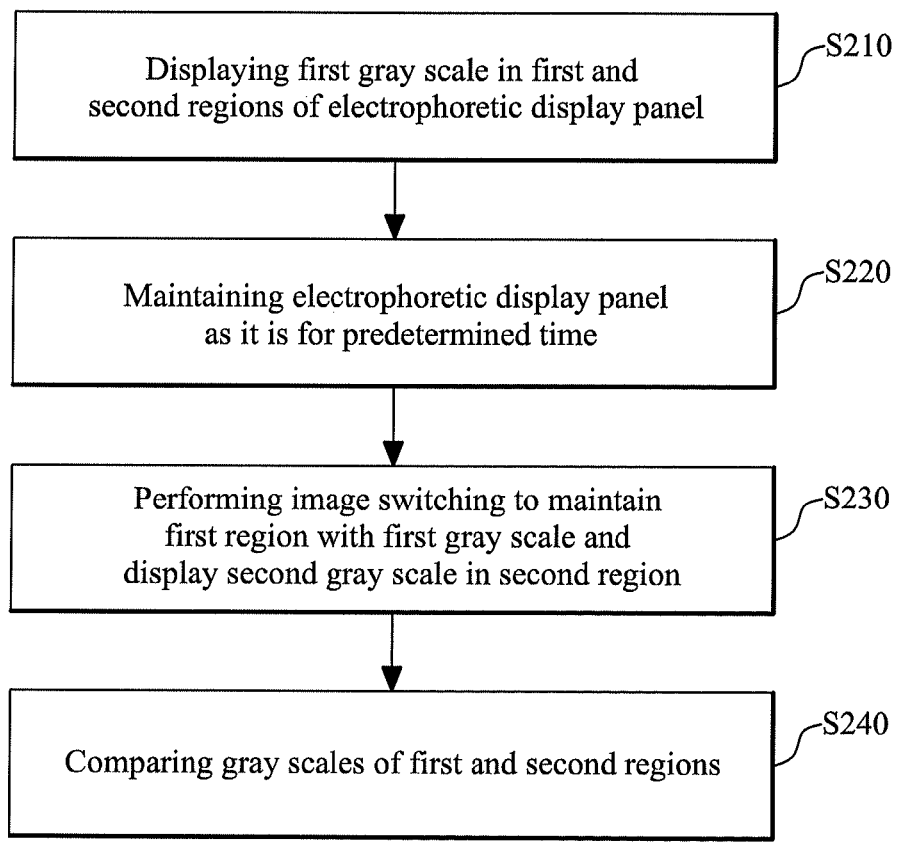
FIG. 14 is a flow chart illustrating a method for measuring the image stability according to the second embodiment of the present invention.
Figure 15:
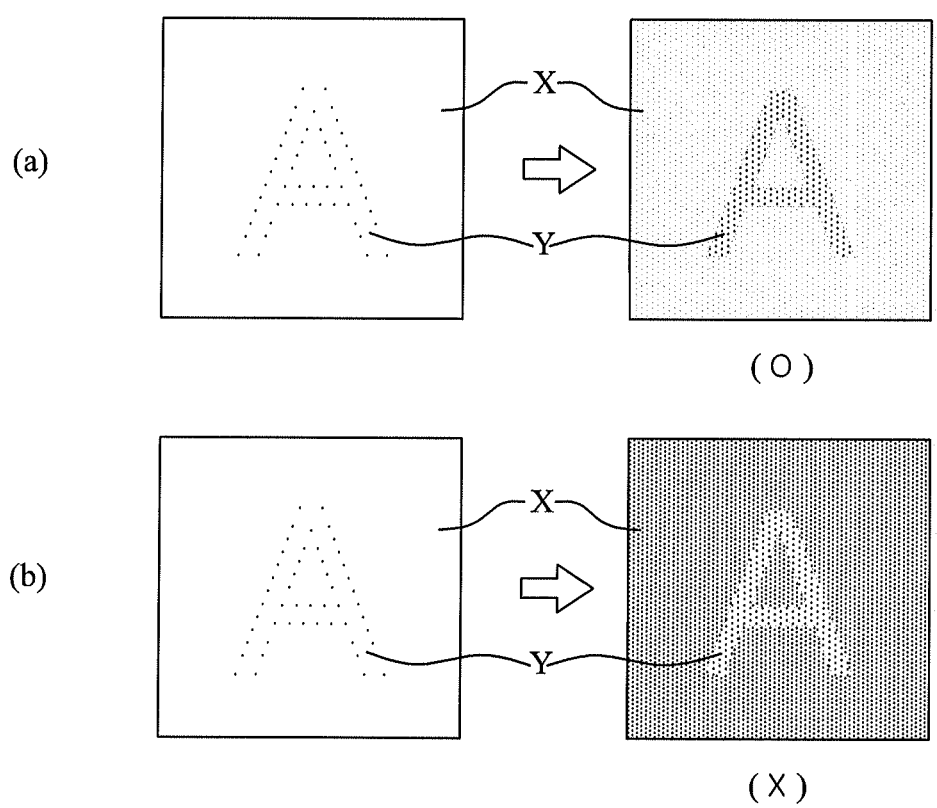
FIG. 15 is a diagram illustrating an image switching performed when the image stability is measured according to the second embodiment of the present invention.

Hereinafter, the method for measuring the image stability of an electrophoretic display apparatus according to the second embodiment of the present invention will be described with reference to FIG. 14 and FIG. 15.

First of all, a display step for displaying a first gray scale in both a first region X and a second region Y of the electrophoretic display panel is performed (S210).

In order to measure the image stability exactly, it is preferable that all the cells of the electrophoretic display panel are updated after being refreshed. Accordingly, the display step S210 can be performed by the GC driving mode. Also, in order to easily identify whether the degree of the gray scale transition is within the allowable range, the second region Y may adjoin the first region X.

Subsequently, the electrophoretic display panel is maintained as it is for a predetermined time without an image switching, i.e., without a data voltage supplied (S220). In this case, the predetermined time should be long enough to identify the image stability of the electrophoretic display apparatus. For example, the predetermined time can be ten minutes to thirty minutes.

Subsequently, an image switching step to maintain the first region X of the electrophoretic display panel with the first gray scale and display a second gray scale different from the first gray scale in the second region Y is performed (S230). At this time, no data voltage is supplied to the first cells corresponding to the first region X to be maintained with the first gray scale. On the other hand, a data voltage for gray scale transition from the first gray scale to the second gray scale is supplied to the second cells corresponding to the second region Y.

In order to perform the image switching step, either of the aforementioned GU or GL driving mode can be used. If the GU driving mode is used for the image switching, although the first region X is illustrated as white in FIG. 15, the first gray scale is not limited to white but can be any gray scale. However, if the GL driving mode is used for the image switching, the first gray scale should be the one that is set under the GL driving mode such that no data voltage should be supplied to the cell to be maintained with that gray scale. For example, if a gray scale set such that no data voltage is supplied to the cell when the gray scale thereof is to be maintained under the GL driving mode is any one of two extreme optical states, the first gray scale should be the one.

Meanwhile, the second gray scale displayed in the second region Y through the image switching is a reference gray scale for measurement of the image stability. The reference gray scale is for determining whether the degree of the gray scale transition which occurs during a predetermined time without a data voltage supplied is within the allowable range. The difference of the gray scale between the reference gray scale and the first gray scale is the same as the allowable maximum gray scale transition. Optionally, the reference gray scale may be one closest to the first gray scale among the gray scales that can be displayed by the electrophoretic display apparatus.

After the image switching is completed, the gray scale of the first region X and the gray scale of the second region Y are compared with each other (S240). If the gray scale of the second region Y, i.e., the second gray scale which is the reference gray scale is more similar to the first gray scale than the gray scale of the first region X after the image switching, it is regarded that the electrophoretic display apparatus fails to pass an image stability test. Namely, when the image switching is performed after a predetermined time passes with the entire screen displaying white, if the gray scale of the first region X is more similar to white than the gray scale of the second region Y as illustrated in FIG. 15(a), it is regarded that the electrophoretic display apparatus passes the image stability test. However, if the gray scale of the second region Y is more similar to white than the gray scale of the first region X as illustrated in FIG. 15(b), it may be regarded that the electrophoretic display apparatus fails to pass the image stability test.

Finally, according to the second embodiment of the present invention, whether the degree of the unintended gray scale transition that might occur after a predetermined time passes without a data voltage supplied exceeds the allowable range can be easily identified by an user through his/her eyes.

Figure 16:
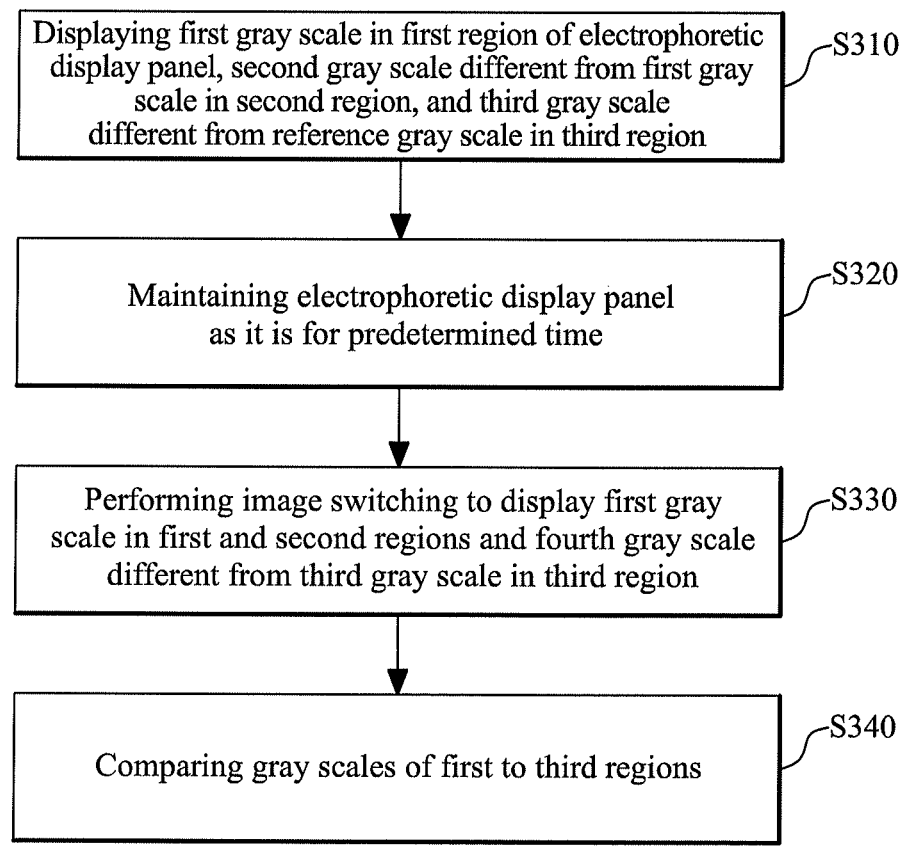
FIG. 16 is a flow chart illustrating a method for measuring the image stability according to the third embodiment of the present invention.

Hereinafter, the method for measuring the image stability of an electrophoretic display apparatus according to the third embodiment of the present invention will be described with reference to FIG. 16 and FIG. 17.

First of all, a display step for displaying a first gray scale in a first region X, displaying a second gray scale different from the first gray scale in a second region adjacent to the first region X, and displaying a third gray scale different from a reference gray scale for measurement of image stability in a third region Z adjacent to the first region X is performed (S310). FIG. 17 illustrates that both the first gray scale and the third gray scale are white.

In order to measure the image stability exactly, it is preferable that all the cells of the electrophoretic display panel are updated after being refreshed. Accordingly, the display step S310 can be performed by the GC driving mode.

In order to easily identify the gray scale transition and its degree, the second region Y may adjoin the first region X. Also, in order to easily identify whether the degree of the gray scale transition is within the allowable range, the third region Z may adjoin the first region X.

Subsequently, the electrophoretic display panel is maintained as it is for a predetermined time without an image switching, i.e., without a data voltage supplied (S320). In this case, the predetermined time should be long enough to identify the image stability of the electrophoretic display apparatus. For example, the predetermined time can be ten minutes to thirty minutes.

Subsequently, an image switching step to display the first gray scale in the cells corresponding to the first and second regions X and Y of the electrophoretic display panel and a fourth gray scale different from the third gray scale in the third region Z is performed (S330). At this time, no data voltage is applied to the first cells corresponding to the first region X. This is because that the first region X is maintained with the first gray scale. On the other hand, a data voltage for gray scale transition from the second gray scale to the first gray scale is supplied to the second cells corresponding to the second region Y, and a data voltage for gray scale transition from the third gray scale to the fourth gray scale is supplied to the third cells corresponding to the third region Z.

Meanwhile, the fourth gray scale displayed in the third region Z through the image switching is a reference gray scale for measurement of the image stability. As described above, the reference gray scale is for identifying whether the degree of the gray scale transition after a predetermined time passes without a data voltage supplied is within the allowable range. The difference of the gray scale between the reference gray scale and the first gray scale is the same as the allowable maximum gray scale transition. Optionally, the reference gray scale may be the one closest to the first gray scale among the gray scales that can be displayed by the electrophoretic display apparatus.

In order to perform the image switching step (S330), either of the aforementioned GU or GL driving mode can be used.

Figure 17:
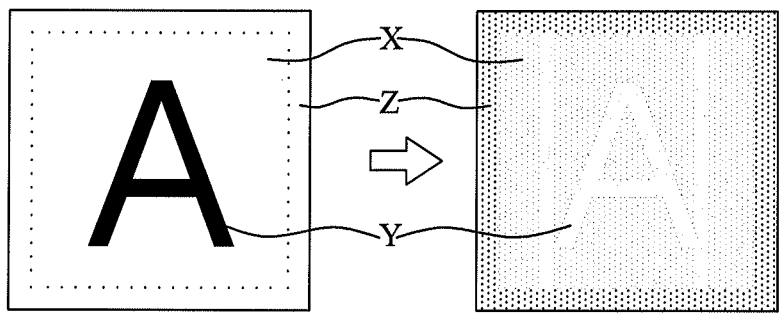
FIG. 17 is a diagram illustrating an image switching performed when the image stability is measured according to the third embodiment of the present invention.
Figure 17:
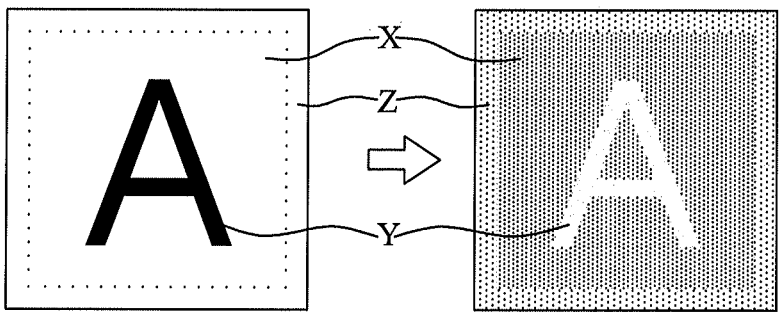

If the GU driving mode is used for the image switching, although the first region X is illustrated as white in FIG. 17, the first gray scale is not limited to white but can be any gray scale. According to the GU driving mode, since the data voltages for refresh and update are supplied only to the cells subject to gray scale transition, the reference gray scale can be displayed definitely in the third region Z after the image switching only if the third gray scale is different from the fourth gray scale which is the reference gray scale.

Meanwhile, if the GL driving mode is used for the image switching, the first gray scale should be the one that is set under the GL driving mode such that no data voltage should be supplied to the cell to be maintained with that gray scale. For example, if a gray scale set such that no data voltage is supplied to the cell when the gray scale thereof is to be maintained under the GL driving mode is any one of two extreme optical states, the first gray scale should be the one. Under the GL driving mode, since the data voltages for refresh and update are also supplied to the cells to be maintained with any gray scale other than the first gray scale during the image switching, the reference gray scale can be displayed definitely in the third region Z after the image switching even if the third and fourth gray scales are the reference gray scale different from the first gray scale and thus identical with each other.

After the image switching is completed, the gray scales of the first to third regions X, Y and Z are compared with one another (S340).

As illustrated in (a) and (b) of FIG. 17, the shapes of the first and second regions X and Y can be identified by an user through his/her eyes due to the difference of the gray scale between the first region X maintained with the first gray scale through the image switching and the second region Y transited from the second gray scale to the first gray scale. While the second region Y displays the first gray scale definitely through refresh and update, the first region X maintained with the first gray scale for a predetermined time without any data voltage supplied cannot display the first gray scale perfectly due to the unintended gray scale transition caused by the movement of the charged particle(s). For this reason, the difference of the gray scale between the first and second regions X and Y occurs. Since the first and second regions X and Y adjoin each other, the difference of the gray scale between the first and second regions X and Y and its degree can be easily recognized by an user through his/her eyes.

Meanwhile, if the gray scale of the third region Z after the image switching step (S330), i.e., the fourth gray scale which is the reference gray scale is more similar to the first gray scale than the gray scale of the first region X after the image switching, it is regarded that the electrophoretic display apparatus fails to pass an image stability test. Namely, when the image switching is performed as above after a predetermined time passes with the first and third regions X and Z displaying white, if the gray scale of the first region X is more similar to the gray scale (white) of the second region Y than the gray scale of the third region Z as illustrated in FIG. 17(a), it is regarded that the electrophoretic display apparatus passes an image stability test. However, if the gray scale of the third region Z is more similar to the gray scale (white) of the second region Y than the gray scale of the first region X as illustrated in FIG. 17(b), it may be regarded that the electrophoretic display apparatus fails to pass the image stability test.

Finally, according to the third embodiment of the present invention, an unintended gray scale transition that may occur after a predetermined time passes without a data voltage supplied and its degree can be recognized directly by an user through his/her eyes. Also, whether such gray scale transition exceeds the allowable range can be identified immediately.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An electrophoretic display apparatus comprising:
   an electrophoretic display panel including gate lines and data lines, which cross each other, the electrophoretic display panel comprising a plurality of cells including first, second and third cells, each cell being in a respective gray scale;
   a gate driver sequentially supplying a scan pulse to the gate lines; and
   a data driver supplying a data voltage to the data lines,
   wherein, when an image switching to change a gray scale of the third cell of the electrophoretic display panel is performed under a first driving mode, the first cell of a first gray scale and the second cell of a second gray scale are maintained respectively without gray scale transition during the image switching, the data driver does not supply any data voltage to a pixel electrode of the first cell while supplying a pixel electrode of the second cell with a data voltage of a predetermined waveform necessary to maintain the second gray scale being different from the first gray scale.

2. The electrophoretic display apparatus of claim 1, wherein the first gray scale is a white color.

3. The electrophoretic display apparatus of claim 1, wherein the predetermined waveform necessary to maintain the second gray scale includes a first sub-waveform for refreshing the second cell.

4. The electrophoretic display apparatus of claim 3, wherein the predetermined waveform necessary to maintain the second gray scale includes a second sub-waveform for updating the refreshed second cell into the second gray scale.

5. The electrophoretic display apparatus of claim 1, wherein, when an image switching is performed under a second driving mode, the data driver supplies all cells of the electrophoretic display panel with a data voltage of a sub-waveform for refreshing the cells regardless of whether gray scale transition occurs or not at the cells.

6. A method for measuring image stability of an electrophoretic display apparatus including an electrophoretic display panel with first and second regions adjacent to each other, the method comprising:
   displaying a first image;
   performing an image switching from the first image to a second image, wherein the image switching from the first image to the second image comprising:
      not supplying data voltage to pixel electrodes of first cells corresponding to the first region, and
      supplying a data voltage to pixel electrodes of second cells corresponding to the second region for gray scale transition; and
   after the image switching to the second image, comparing a first gray scale displayed in the first region with a second gray scale displayed in the second region to determine the image stability of the electrophoretic display apparatus based on a gray scale compared difference between the first region and the second region.

7. The method of claim 6, wherein the displaying includes:
   displaying a first gray scale in the first region; and
   displaying a second gray scale in the second region, the second gray scale being different from the first gray scale, and
   wherein, when the image switching is performed, a data voltage for gray scale transition from the second gray scale to the first gray scale is supplied to the pixel electrodes of the second cells.

8. The method of claim 7, wherein the first gray scale is any one of two extreme optical states that can be displayed by the electrophoretic display apparatus.

9. The method of claim 7, further comprising, between the displaying step and the image switching step, maintaining the electrophoretic display panel as it is for a predetermined time without an image switching.

10. The method of claim 6, wherein the displaying step includes displaying a first gray scale in the first and second regions, and
    wherein, when the image switching is performed, a data voltage for gray scale transition from the first gray scale to a second gray scale different from the first gray scale is supplied to the pixel electrodes of the second cells.

11. The method of claim 10, wherein the first gray scale is any one of two extreme optical states that can be displayed by the electrophoretic display apparatus, and the second gray scale is a reference gray scale for measurement of image stability.

12. The method of claim 10, further comprising, between the displaying step and the image switching step, maintaining the electrophoretic display panel as it is for a predetermined time without an image switching.

13. A method for measuring image stability of an electrophoretic display apparatus including an electrophoretic display panel with first and second regions adjacent to each other, the method comprising:

displaying a first image on the electrophoretic display panel; and performing an image switching from the first image to a second image, wherein, when the image switching is performed, no data voltage is supplied to pixel electrodes of first cells corresponding to the first region and a data voltage for gray scale transition is supplied to pixel electrodes of second cells corresponding to the second region, wherein the electrophoretic display panel further includes a third region adjacent to the first region, and the displaying step includes:

displaying a first gray scale in the first region;

displaying a second gray scale in the second region, the second gray scale being different from the first gray scale; and displaying a third gray scale in the third region, and wherein, when the image switching is performed, a data voltage for gray scale transition from the second gray scale to the first gray scale is supplied to the pixel electrodes of the second cells, and a data voltage for gray scale transition from the third gray scale to a fourth gray scale different from the third gray scale is supplied to pixel electrodes of third cells corresponding to the third region.

14. The method of claim 13, wherein the first gray scale is any one of two extreme optical states that can be displayed by the electrophoretic display apparatus, and the fourth gray scale is a reference gray scale for measurement of image stability.

15. The method of claim 14, wherein the first gray scale and the third gray scale are identical with each other.

16. The method of claim 13, further comprising, after performing the image switching, comparing gray scales of the first, second and third regions with one another to determine the image stability of the electrophoretic display apparatus.

* * * * *